United States Patent
O'Connell (10) Patent No.: US 10,862,780 B2
(45) Date of Patent: *Dec. 8, 2020

(54) AUTOMATIC WEB PAGE LOAD DETECTION

(71) Applicant: Cisco Technology, Inc., San Jose, CA (US)

(72) Inventor: Ryan O'Connell, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,455

(22) Filed: Jun. 19, 2019

(65) Prior Publication Data

US 2019/0306032 A1    Oct. 3, 2019

Related U.S. Application Data

(63) Continuation of application No. 15/338,450, filed on Oct. 31, 2016, now Pat. No. 10,382,298.

(51) Int. Cl.
| | |
|---|---|
| *H04L 12/26* | (2006.01) |
| *H04L 29/08* | (2006.01) |
| *H04L 12/24* | (2006.01) |

(52) U.S. Cl.
CPC ........ *H04L 43/067* (2013.01); *H04L 41/5019* (2013.01); *H04L 43/045* (2013.01); *H04L 67/02* (2013.01); *H04L 43/0888* (2013.01)

(58) Field of Classification Search
CPC . H04L 43/067; H04L 43/045; H04L 43/0888; H04L 41/5019; H04L 67/02

(Continued)

(56) References Cited

U.S. PATENT DOCUMENTS

| | | | |
|---|---|---|---|
| 7,330,887 B1 | 2/2008 | Dharmadhikari | ... G06F 11/3419 709/224 |
| 8,266,281 B1 | 9/2012 | Carlson | ............... G06F 11/3419 709/203 |

(Continued)

OTHER PUBLICATIONS

James Thorpe, Is it normal a long idle time in Google Chrome, Apr. 28, 2016, stackoverflow.com, https://stackoverflow.com/questions/36919749/is-it-normal-a-long-idle-time-in-google-chrome-console-snapshot (Year: 2016).

(Continued)

*Primary Examiner* — Zi Ye
(74) *Attorney, Agent, or Firm* — Behmke Innovation Group LLC; James M. Behmke; Jonathon P. Western (57) ABSTRACT

In one aspect, a system for automatic detection of webpage loading at a web browser of a client device in a monitored environment is disclosed. The system includes: a processor; a memory; and one or more modules stored in the memory and executable by a processor to perform operations. The operations include: detect start of loading of a webpage at the web browser of the client device in the monitored environment; set a dynamic watchdog repeating timer at a value; start the timer; recursively check for completion of the loading of the webpage; when determined that the loading of the webpage has completed, determine whether a Java script engine of the web browser loading the webpage is idle; and when determined that the Java script engine of the web browser loading the webpage is idle, stop the timer and generate a report of the webpage.

20 Claims, 7 Drawing Sheets

(58) Field of Classification Search
USPC .......................................................... 709/224
See application file for complete search history.

(56) References Cited

U.S. PATENT DOCUMENTS

| 10,382,298 B2* | 8/2019 | O'Connell ............ H04L 43/045 |
| 2002/0083188 A1 | 6/2002 | Hericy ................ G06F 11/3419 |
| | | 709/235 |
| 2008/0104224 A1 | 5/2008 | Litofsky ............. G06F 17/3089 |
| | | 709/224 |
| 2013/0067069 A1 | 3/2013 | Allen ...................... G06F 9/466 |
| | | 709/224 |

OTHER PUBLICATIONS

Galambalazs, Capture iframe load complete event, Jun. 29, 2010, stackoverflow.com, https://stackoverflow.com/questions/3142837/capture-iframe-load-complete-event (Year: 2010).

* cited by examiner

AUTOMATIC WEB PAGE LOAD DETECTION

RELATED APPLICATION

This application is a continuation of U.S. patent application Ser. No. 15/338,450, filed Oct. 31, 2016, entitled AUTOMATIC WEB PAGE DETECTION, by Ryan O'Connell, the contents of which are incorporated herein by reference.

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of automatic web page detection are disclosed. Specifically, the disclosed automatic web page detection is used to perform accurate web page reports during performance monitoring.

In one aspect, a system for automatic detection of webpage loading at a web browser of a client device in a monitored environment is disclosed. The system includes: a processor; a memory; and one or more modules stored in the memory and executable by a processor to perform operations. The operations include: detect start of loading of a webpage at the web browser of the client device in the monitored environment; set a dynamic watchdog repeating timer at a value; start the timer; recursively check for completion of the loading of the webpage; when determined that the loading of the webpage has completed, determine whether a Java script engine of the web browser loading the webpage is idle; and when determined that the Java script engine of the web browser loading the webpage is idle, stop the timer and generate a report of the webpage.

The system can be implemented in various ways to include one or more of the following features. For example, when determining that that the loading of the webpage has not completed, the one or more modules can be executable to perform operations including: reset the timer; restart the reset timer; and perform the recursively check for completion of the loading of the webpage. When determining whether the Java script engine of the web browser loading the webpage is idle, the one or more modules can be executable to perform operations including: determine whether any network requests have ended in a most recent pre-determined time period. The one or more modules can be executable to perform the recursively check for completion of the loading of the webpage including: determine whether all pending network requests have finished; or determine whether a global ceiling has been reached; or determine both that all pending network requests have finished and a global ceiling has been reached. The one or more modules can be executable to perform the recursively check for completion of the loading of the webpage including: check for iframes; and attach load listeners to the iframes when found. The one or more modules can be executable to perform operations including: receive data associated with the monitored environment including applications performed over a distributed system of interconnected nodes of machines; receive the generated report; and correlate the received data with the generated report. The one or more modules can be executable to perform operations including: identify performance issues with the monitored applications from the received data; and determine a relationship between the identified performance issues and the generated report of the webpage. The system of claim 6, wherein the one or more modules are executable to perform operations including: identify nodes of interest and one or more chains of nodes connected to the nodes of interest from the interconnected nodes based on the received data; generate an interactive flow map of the interconnected nodes in the distributed system; provide a user interface for displaying the interactive flow map; and automatically display the interactive flow map and the correlated report through the provided user interface.

In another aspect, a method for automatic detection of webpage loading at a web browser of a client device in a monitored environment is disclosed. The method includes detecting start of loading of a webpage at the web browser of the client device in the monitored environment; setting a dynamic watchdog repeating timer at a value; starting the timer; recursively checking for completion of the loading of the webpage; when determined that the loading of the webpage has completed, determining whether a Java script engine of the web browser loading the webpage is idle; and when determined that the Java script engine of the web browser loading the webpage is idle, stopping the timer and generating a report of the webpage.

The method can be implemented in various ways to include one or more of the following features. For example, when determining that that the loading of the webpage has not completed, operations can be performed including: resetting the timer; restarting the reset timer; and performing the recursively check for completion of the loading of the webpage. When determining whether the Java script engine of the web browser loading the webpage is idle, operations can be including: determining whether any network requests have ended in a most recent pre-determined time period. Recursively checking for completion of the loading of the webpage can include: determining whether all pending network requests have finished; or determining whether a global ceiling has been reached; or determining that both all pending network requests have finished and a global ceiling has been reached. Recursively checking for completion of the loading of the webpage can include: checking for iframes; and attaching load listeners to the iframes when found. The method can include receiving data associated with the monitored environment including applications performed over a distributed system of interconnected nodes of machines; receiving the generated report; and correlating the received data with the generated report. The method can include identifying performance issues with the monitored applications from the received data; and determining a relationship between the identified performance issues and the generated report of the webpage. The method can include: identifying nodes of interest and one or more chains of nodes connected to the nodes of interest from the interconnected nodes based on the received data; generating an interactive flow map of the interconnected nodes in the distributed system; provide a user interface for displaying the interactive flow map; and automatically displaying the interactive flow map and the correlated report through the provided user interface.

In yet another aspect, a non-transitory computer readable medium embodying instructions when executed by a processor to cause operations to be performed for automatic detection of webpage loading at a web browser of a client device in a monitored environment is disclosed. The operations include: detecting start of loading of a webpage at the web browser of the client device in the monitored environment; setting a dynamic watchdog repeating timer at a value; starting the timer; recursively checking for completion of the loading of the webpage; when determined that the loading of the webpage has completed, determining whether a Java script engine of the web browser loading the webpage is idle; and when determined that the Java script engine of the web browser loading the webpage is idle, stopping the timer and generating a report of the webpage.

The non-transitory computer readable medium can be implemented in various ways to include one or more of the following features. For example, when determining that that the loading of the webpage has not completed, operations can be performed including: resetting the timer; restarting the reset timer; and performing the recursively check for completion of the loading of the webpage. When determining whether the Java script engine of the web browser loading the webpage is idle, operations can be performed including: determining whether any network requests have ended in a most recent pre-determined time period. Recursively checking for completion of the loading of the webpage include: determining whether all pending network requests have finished; or determining whether a global ceiling has been reached; or determining that both all pending network requests have finished and a global ceiling has been reached. Recursively checking for completion of the loading of the webpage can include: checking for iframes; and attaching load listeners to the iframes when found. The operations can include receiving data associated with the monitored environment including applications performed over a distributed system of interconnected nodes of machines; receiving the generated report; and correlating the received data with the generated report. The operations can include: identifying performance issues with the monitored applications from the received data; and determining a relationship between the identified performance issues and the generated report of the webpage. The operations can include identifying nodes of interest and one or more chains of nodes connected to the nodes of interest from the interconnected nodes based on the received data; generating an interactive flow map of the interconnected nodes in the distributed system; providing a user interface for displaying the interactive flow map; and automatically displaying the interactive flow map and the correlated report through the provided user interface.

DETAILED DESCRIPTION

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. For example, when monitoring and reporting of web pages including any performance issues, the complete loading of the web pages must be accurately detected to prevent generating a report during middle of the loading of the webpages, which will provide inaccurate information.

Automatic Detection of Web Page Loading Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to automatically detect webpage loading. The disclosed technology provides the automatic detection of webpage loading so that a report of the webpage can be generated after the web page has finished loading and rendering the loaded data to provide accurate up to date information on the webpage. Generating a webpage report can include generating a snapshot image of the webpage in PDF format, for example. Current reporting mechanisms for webpages rely on detecting that all scripts on the base page have loaded. Any webpage with asynchronously loaded data can be left partially rendered when generating a PDF or Image based report. When a report is generated for a web page when the loaded data is only partially rendered, the generated webpage report is inaccurate and unusable. The disclosed technology can be used to detect a loaded state for a webpage which makes serially dependent network calls to the server in order to display report data. The network calls may be images, iframes, and other data network calls to complete before the snapshot takes place.

The disclosed technology advantageous over methods that use a static timeout. Using static timeouts is not effective because a static timeout by nature rely on a single timeout value for all situations, meaning every report (big and small) need to wait for this timeout before completing the report rendering. A static timeout also may not be large enough, and can result in incomplete reports.

Automatic Detection of Web Page Loading Process

As discussed above, taking screenshots of a product can be difficult when the product is a dynamically loaded web page. Detecting that a web page has finished loading and rendering the loaded data is not a trivial problem. Resources such as iframes (web pages within webpages), images and other network based resources are difficult to track. Intermediate processing in browsers virtual machine (VM) may also make the task difficult, as network requests may occur asynchronously as a small amount of time processing has happened between network requests.

The disclosed technology provides a solution to the problem of automatically detecting loading of webpages and rendering of the loaded data includes methods for tracking two sets of conditions: 1) track all resources being loaded including images, iframes, and other network requests and 2) track the last received request's timestamp. Using these methods for tracking the two sets of conditions together, the disclosed technology can be used to consistently determine when there are inflight requests and whether the timestamp of last request has completed—that the webpage has loaded and rendered all loaded data.

A pre-determined timeout period (e.g., 1 to 2.5 seconds) can be used by a Reporter (which can be installed at the web browser of a client device) to poll whether a given webpage has finished loading and rendering the loaded data by verifying both that there are no open network requests and the last request completed is completed more than [x] seconds ago, where [x] is a configurable timeout value. The value of [x] can be set to the largest possible amount of time that the webpage will use for processing computation, layout, and rendering.

Figure 1A:
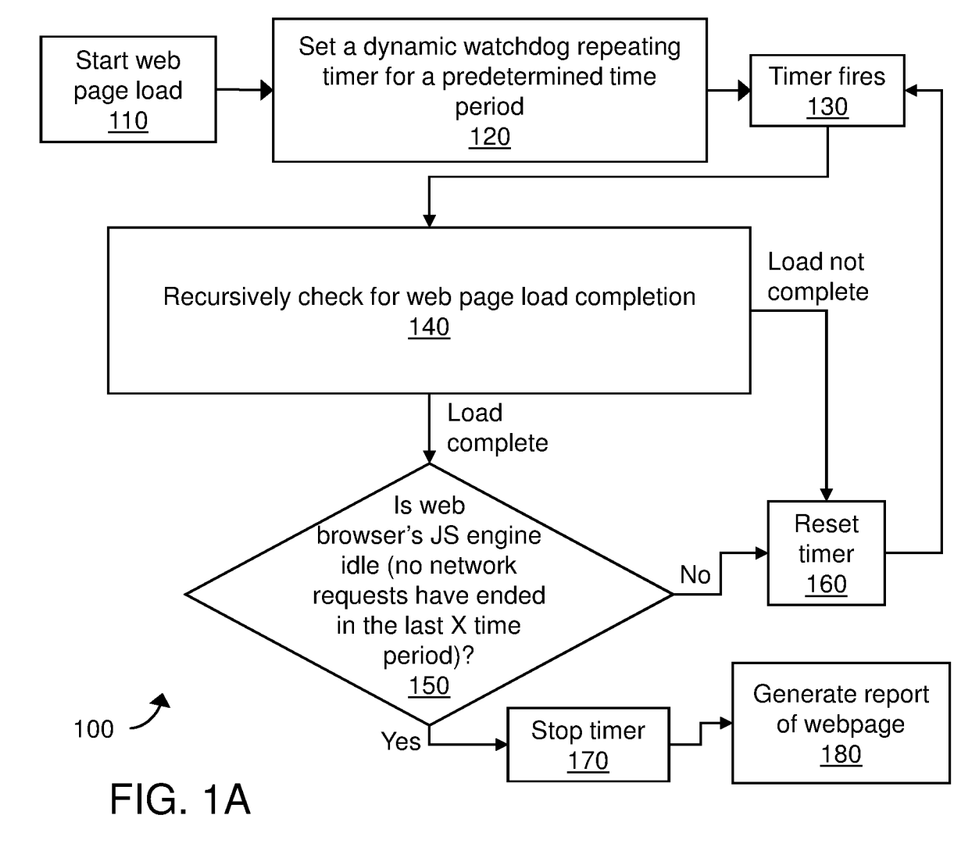
FIG. 1A is a process flow diagram of an exemplary process for automatically detecting web page loading.
Figure 1B:
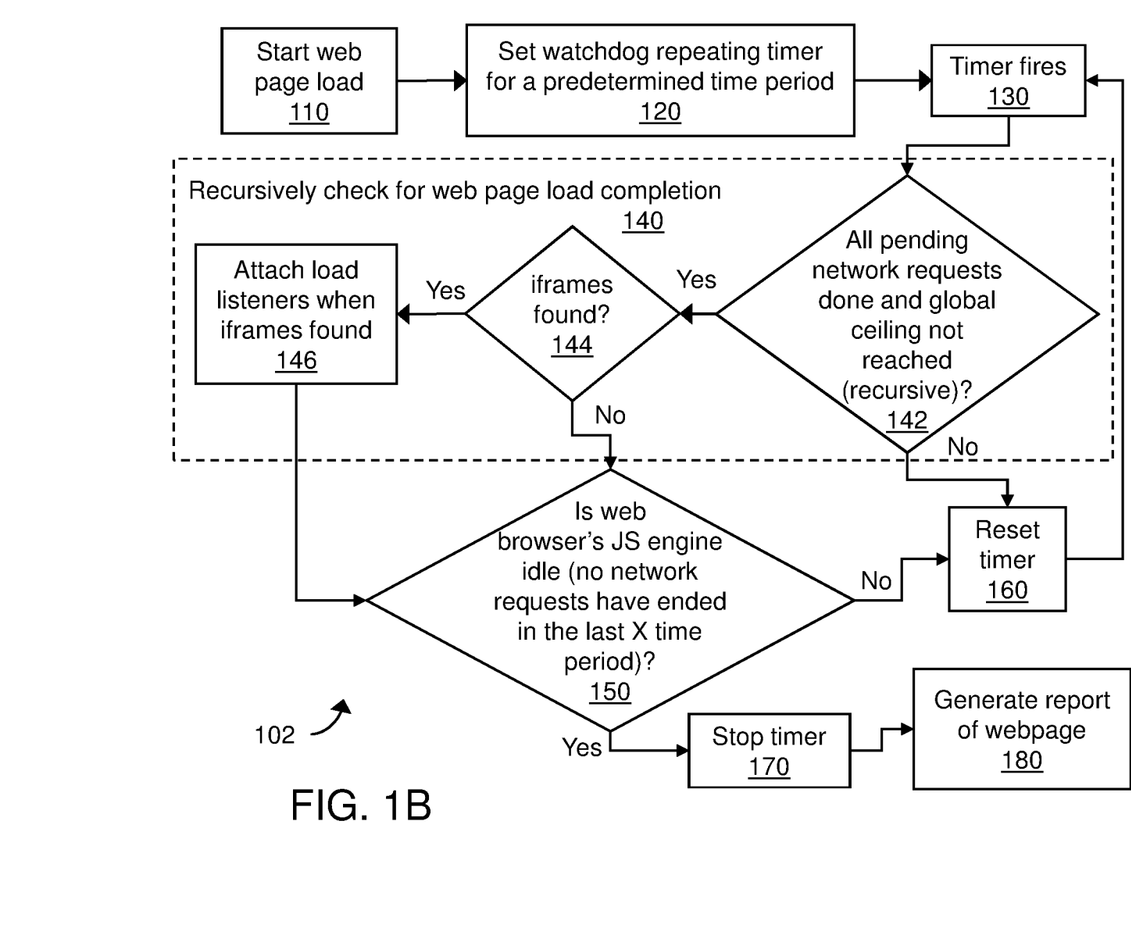
FIG. 1B is a process flow diagram of another exemplary process for automatically detecting web page loading that adds additional features to the process disclosed in FIG. 1A.

FIGS. 1A and 1B are process flow diagrams of exemplary processes 100 and 102 for automatically detecting of web page loading and rendering of he loaded data as disclosed. The process 102 is substantially similar to the process 100 but add additional features for recursively checking for completion of the webpage loading. The process includes detecting start of webpage loading (110). A dynamics watchdog repeating timer is set for a timeout period (e.g., between 1 and 2.5 seconds as previous disclosed) (120) and the timer is started (130). The Reporter performs recursive checks for webpage loading completion (140). When detecting that the webpage loading has not completed, the time is reset (160), and the process returns to restart the reset timer (130). When detecting that the webpage loading has completed, the Report determines whether the web browser's Java scrip (JS) engine idle and that no network requests have ended in the last [x] time period (150). When detecting that the web browser's Java scrip (JS) engine idle and that no network requests have ended in the last [x] time period, the timer is stopped (170), and a report of the web page is generated (180). The generated web page report can include a snapshot image of the webpage that has completed loading and rendering. When detecting that the web browser's Java scrip (JS) engine is not idle and that network requests have ended in the last [x] time period, the timer is reset (16), and the process returns to restart the reset timer (130).

In FIG. 1B, the process 102 shows additional features for recursively checking for web page load completion (140). After the timer fires (130), the Reporter determines whether all pending network requests are done a global ceiling has not been reached (142). When determining that not all pending network requests are done and/or a global ceiling has been reached, the timer is reset (160), and the process returns to restart the reset timer (130).

When determining that all pending network requests are done and a global ceiling has not been reached, the webpage is searched to determine whether iframes are found (144). When determining that iframes are found, load listeners are attached to the iframes (146). When determined that iframes are not found or after the load listeners are attached to the found iframes, the process moves to check whether the web browser is idle (150). Specifically, a determination is made at 150 whether the web browser's JS engine is idle and that no network requests have ended in the last [x] time period, the timer is stopped (170), and a report of the web page is generated (180). The generated web page report can include a snapshot image of the webpage that has completed loading and rendering. When detecting that the web browser's Java scrip (JS) engine is not idle and that network requests have ended in the last [x] time period, the timer is reset (16), and the process returns to restart the reset timer (130).

Figure 2A:
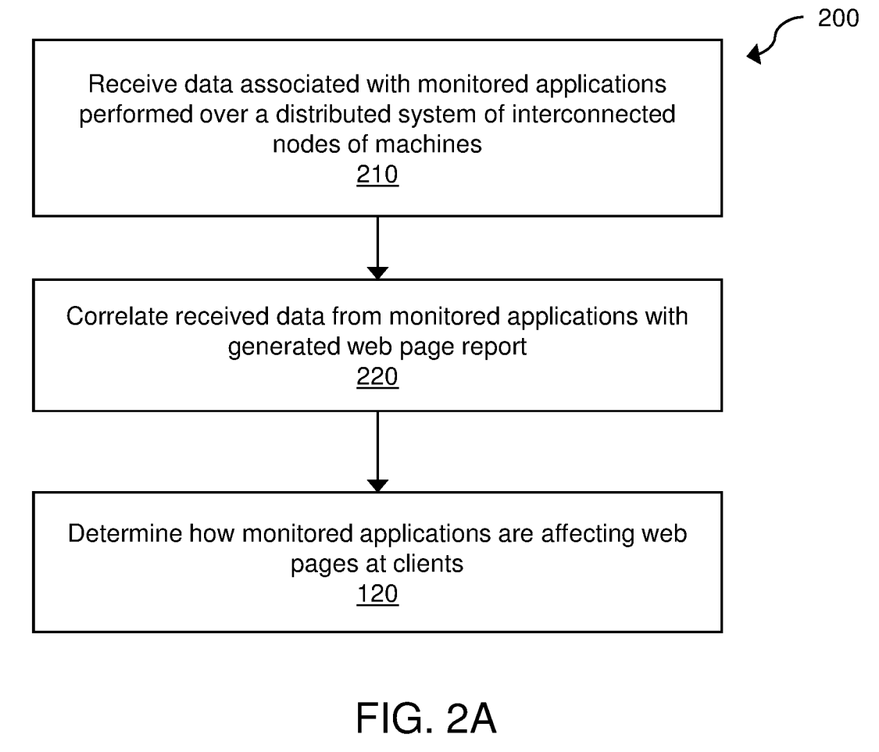
FIGS. 2A and 2B are process flow diagrams of exemplar processes for correlating monitored performance data and the generated webpage report.
Figure 2B:
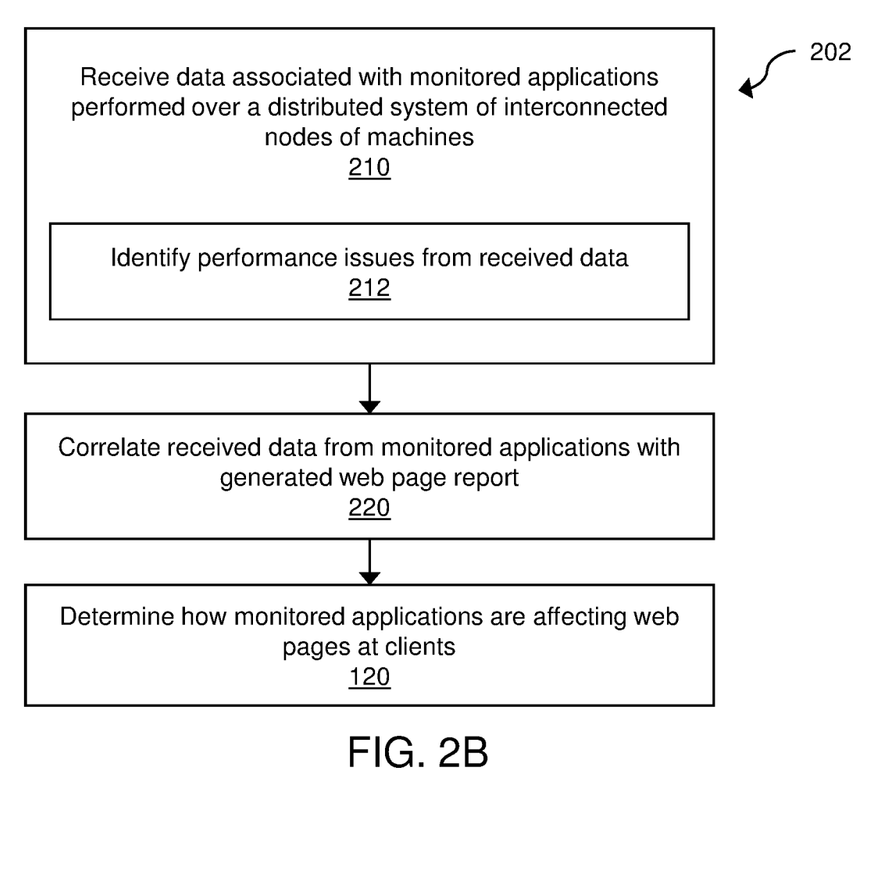

FIGS. 2A and 2B are process flow diagrams of exemplar processes 200 and 202 for correlating monitored performance data and the generated webpage report. As discussed further below with respect to FIGS. 5-7, performance issues with a monitored environment is detected by monitoring applications and nodes in the monitored environment using agents installed at individual machines in the nodes. Each node can include one or more machines that perform part of the applications. The agents collect data associated with the applications of interest and associated nodes and machines where the applications are being operated. Examples of the collected data include performance data, such as metrics, metadata, and topology data that indicate relationship information. A controller in communication with the agents receive the data collected by the agents (210). The controller can analyze the received monitored data to identify performance issues with the monitored applications (212). The controller analyzes the received data and the generated report to correlate the monitored data with the webpage report (220). The correlation can be used to illustrate how monitored applications are related to and affects the webpages at the clients (e.g. client devices with network connections to the monitored applications). In some implementations, any performance issues identified from the monitored data can be correlated to the webpage report that shows the conditions, status, and performance of the web pages, for example.

In some implementations, the controller can also analyze the monitored data to identify nodes of interest. The nodes of interest can be those nodes with performance issues (e.g., compared to a threshold, based on classification algorithm, machine learning, etc.). The controller can generate an interactive flow map of the monitored environment with vertices representing tiers and nodes of machines that perform the applications. The collected data that includes metadata or topology data can be used to generate the interactive flow map. The interactive flow map also shows the connections (indicating the relationship information) between the vertices to show how the vertices are connected to one another.

Through the user interface, the controller can display the generated flow map with the identified nodes of interest automatically visually differentiated from rest of the nodes in the flow map. For example, the nodes of interest can be displayed with a different color than the rest of the normal nodes. All of the nodes of interest having performance issues can be displayed as red nodes and the normal nodes can be displayed as green nodes, for example. Other ways to differentiate the nodes of interest include using highlights, shadings, sizes, etc. By visually differentiating the nodes of interest, potential problems in the monitored nodes and applications can be easily and instantaneous conveyed to a user.

Application Intelligence Platform Architecture

Figure 3:
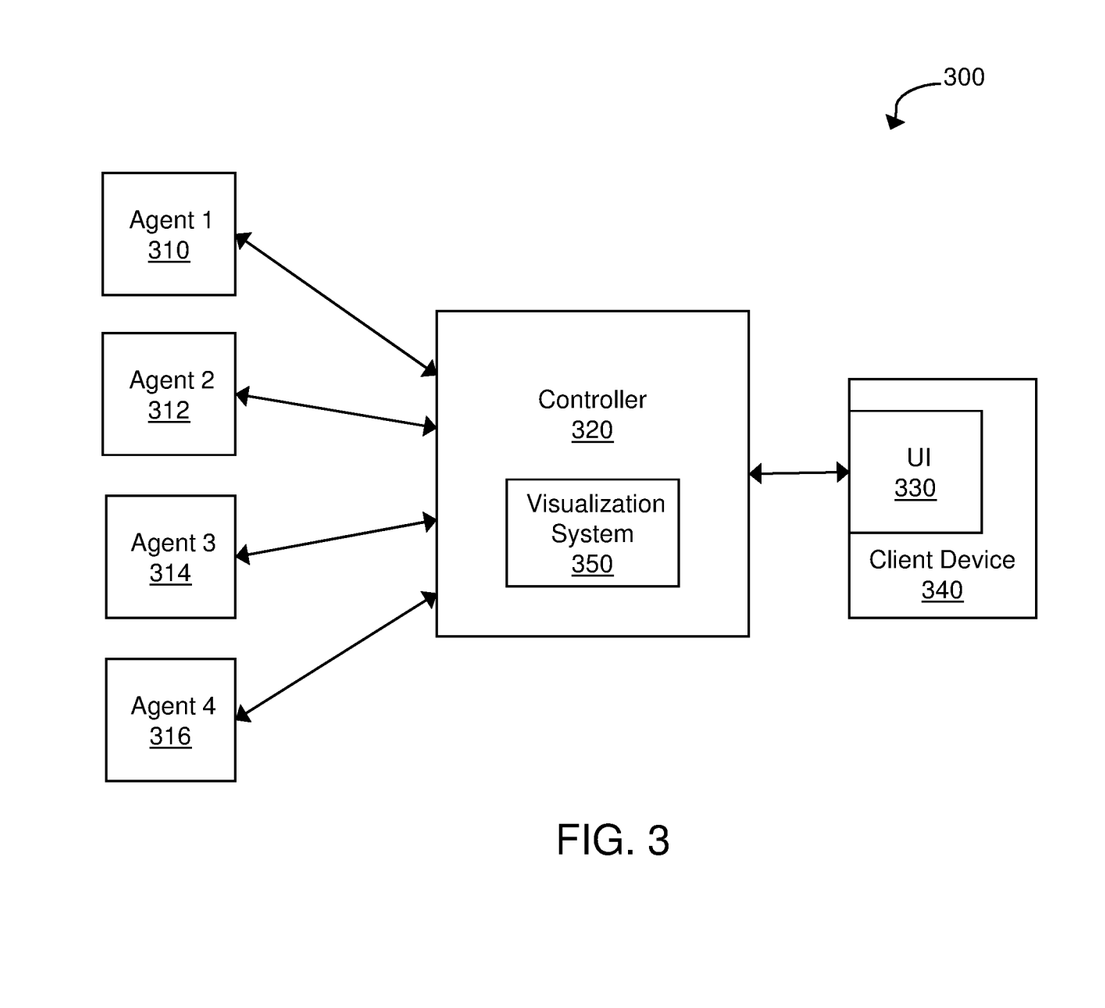
FIG. 3 is a block diagram of an exemplary application intelligence platform that can implement the automatic detection of webpage loading as disclosed in this patent document.

FIG. 3 is a block diagram of an exemplary application intelligence platform 300 that can implement the automatic detection of webpage loading as disclosed in this patent document. The application intelligence platform is a system that monitors and collect metrics of performance data for an application environment being monitored. At the simplest structure, the application intelligence platform includes one or more agents 310, 312, 314, 316 and one or more controllers 320. While FIG. 3 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 320 is the central processing and administration server for application intelligence platform. The controller 320 serves a browser-based user interface (UI) 330 that is the primary interface for monitoring, analyzing, and troubleshooting the monitored environment. The controller 320 can control and manage monitoring of business transactions distributed over application servers. Specifically, the controller 320 can receive runtime data from agents 310, 312, 314, 316 and coordinators, associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data.

In the Software as a Service (SaaS) implementation, a controller instance 320 is hosted remotely by a provider of the application intelligence platform 300. In the on-premise (On-Prem) implementation, a controller instance 320 is installed locally and self-administered.

The controllers 320 receive data from different agents 310, 312, 314, 316 deployed to monitor applications, databases and database servers, servers, and end user clients for the monitored environment. Any of the agents 310, 312, 314, 316 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 310, 312, 314, 316) can include Reporters that perform the automatic webpage loading detection as disclosed in this patent document.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 320 can include a visualization system 350 for displaying the reports generated by the Reporters at the browser agents as disclosed in this patent document. In some implementations, the visualization system 350 can be implemented in a separate machine (e.g., a server) different from the one hosting the controller 320.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent erode cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture application at a certain point in time. Snapshots usually include call graphs that allow that enables drilling down to the line of code that may be causing performance problems. The most common snapshots are transaction snapshots.

Exemplary Implementation of Application Intelligence Platform

Figure 4:
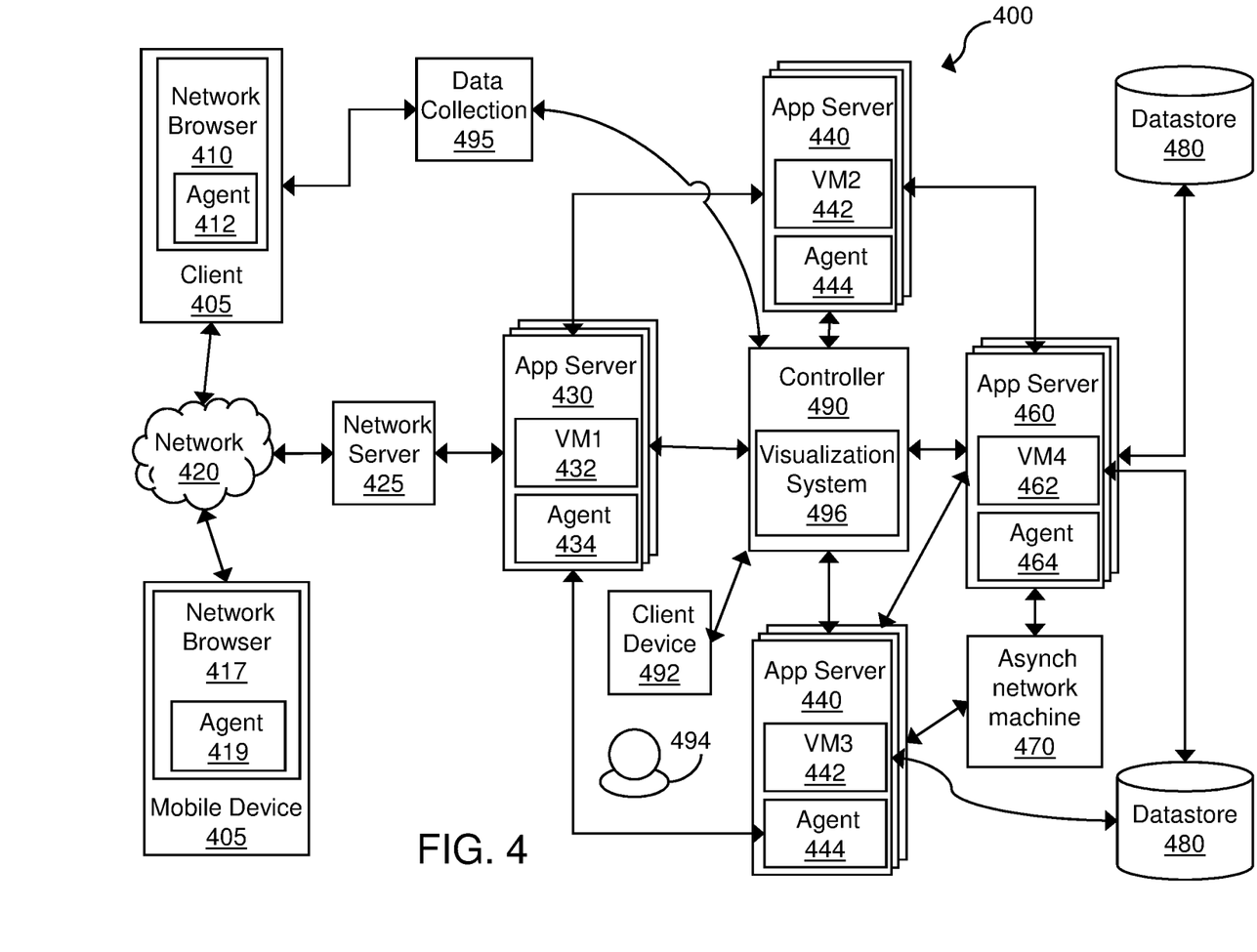
FIG. 4 is a block diagram of an exemplary system for automatic detection of webpage loading as disclosed in this patent document, including the processes disclosed with respect to FIGS. 1A-1B and 2A-2B.

FIG. 4 is a block diagram of an exemplary system 400 for automatic detection of webpage loading as disclosed in this patent document, including the processes disclosed with respect to FIGS. 1A-B and 2A-2B. The system 400 in FIG. 4 includes client device 405 and 492, mobile device 415, network 420, network server 425, application servers 430, 440, 450 and 460, asynchronous network machine 470, data stores 480 and 485, controller 490, and data collection server 495. The controller 490 can include visualization system 496 for providing displaying of the report generated by the Reporters at the browser agents as disclosed in this patent document. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including the Report for automatic detection of webpage loading and report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420.

Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e. "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454 and 464 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450 and 460 may include an application and agents. Each application may run on the corresponding application server. Each of applications 442, 452 and 462 on application servers 440-460 may operate similarly to application 432 and perform at least a portion of a distributed business transaction. Agents 444, 454 and 464 may monitor applications 442-462, collect and process data at runtime, and communicate with controller 490. The applications 432, 442, 452 and 462 may communicate with each other as part of performing a distributed transaction. In particular, each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444 and 454. Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452 and 462 may be any of several types of applications. Examples of applications that may implement applications 432-462 include a Java, PHP, .Net, Node.JS, and other applications.

Figure 5:
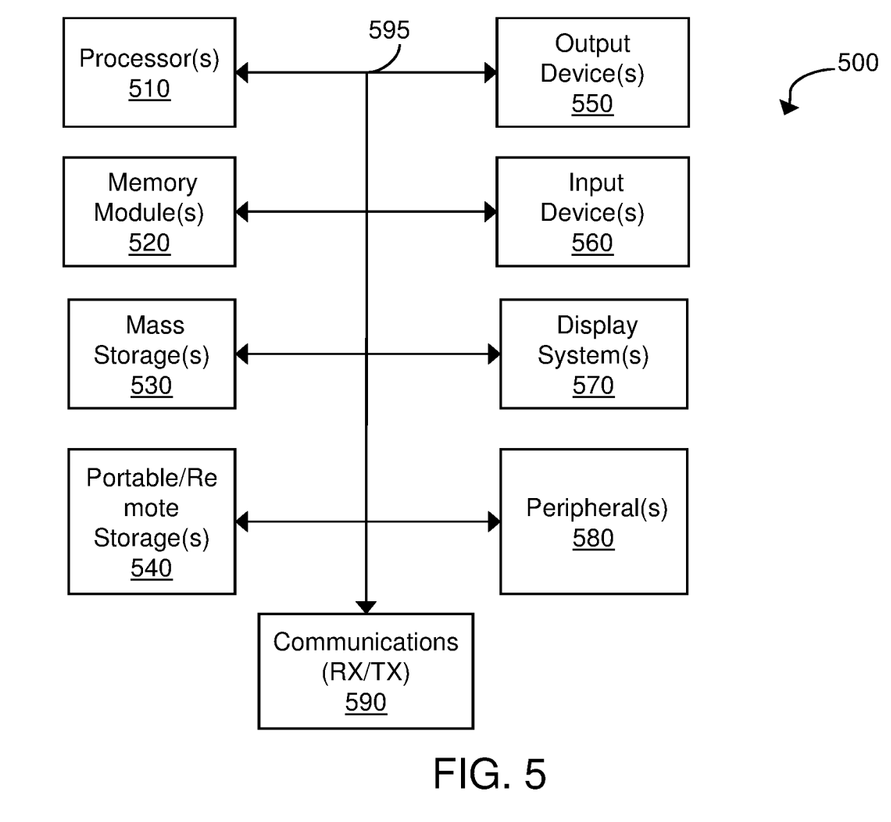
FIG. 5 is a block diagram of an exemplary computing system implementing the disclosed technology.

FIG. 5 is a block diagram of a computer system 500 for implementing the present technology. System 500 of FIG. 5 may be implemented in the contexts of the likes of clients 405, 492, network server 425, servers 430, 440, 450, 460, a synchronous network machine 470 and controller 490.

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 620.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus comprising:
    a processor configured to execute one or more processes; and
    a memory configured to store a process executable by the processor, the process when executed configured to:
        receive a report generated by a device in a distributed business transaction monitoring system, wherein the report is generated by the device when the device determines that a web page loading on a web browser of a client device that the device is monitoring has completed loading and is idle;
        identify nodes of interest and one or more chains of nodes connected to the nodes of interest as a plurality of interconnected nodes based on the received report;
        generate an interactive flow map of the plurality of interconnected nodes in the distributed business transaction monitoring system;
        provide the interactive flow map to a user interface for displaying the interactive flow map; and
        cause the user interface to automatically display the interactive flow map and the received report through the user interface.

2. The apparatus of claim 1, wherein the device determines that the web page has completed loading by:
    setting a dynamic watchdog repeating timer at a value;
    starting the timer; and
    recursively checking for whether the web page has completed loading.

3. The apparatus of claim 2, wherein when the device determines that the web page has not completed, the device is configured to:
    reset the timer;
    restart the timer; and
    recursively check, subsequent to restarting the timer, for whether the web page has completed loading.

4. The apparatus of claim 2, wherein recursively checking for whether the web page has completed loading comprises at least one of:
    determining whether all pending network requests have finished,
    determining whether a global ceiling has been reached, or
    determining that all the pending network requests have finished and that the global ceiling has been reached.

5. The apparatus of claim 2, wherein recursively checking for whether the web page has completed loading comprises:
    checking for one or more iframes; and
    attaching, when the one or more iframes are found, load listeners to the one or more iframes.

6. The apparatus of claim 1, wherein the device is configured to determine that the web page is idle by determining whether a Java script engine of the web browser is idle.

7. The apparatus of claim 6, wherein the device determines whether the Java script engine is idle by determining whether at least one network request has ended in a most recent pre-determined time period.

8. The apparatus of claim 1, the apparatus is further configured to:
    receive data associated with one or more monitored applications on the plurality of interconnected nodes;
    identify performance issues with the one or more monitored applications from the received data; and
    determine a relationship between the identified performance issues and the generated report of the web page.

9. A method comprising:
    receiving, by a device in a distributed business transaction monitoring system, a report generated by an agent in the distributed business transaction monitoring system, wherein the report is generated by the agent when the agent determines that a web page loading on a web browser of a client device the device is monitoring has completed loading and is idle;
    identifying, by the device, nodes of interest and one or more chains of nodes connected to the nodes of interest as a plurality of interconnected nodes based on the received report;
    generating, by the device, an interactive flow map of the plurality of interconnected nodes in the distributed business transaction monitoring system;
    providing, by the device, the interactive flow map to a user interface for displaying the interactive flow map; and
    causing, by the device, the user interface to automatically display the interactive flow map and the report through the user interface.

10. The method of claim 9, wherein the agent determines that the web page has completed by:
    setting, by the agent, a dynamic watchdog repeating timer at a value;
    starting, by the agent, the timer; and
    recursively checking, by the agent, for whether the web page has completed loading.

11. The method of claim 10, wherein when the agent determines that the web page has not completed, further comprising:
    resetting, by the agent, the timer;
    restarting, by the agent, the timer; and
    recursively checking, by the agent and subsequent to restarting the time, whether the web page has completed loading.

12. The method of claim 10, wherein the recursively checking, by the agent, whether the web page has completed loading includes:
    determining, by the agent, whether all pending network requests have finished;
    determining, by the agent, whether a global ceiling has been reached; or
    determining, by the agent, that all the pending network requests have finished and that the global ceiling has been reached.

13. The method of claim 10, wherein the recursively checking, by the agent, whether the web page has completed loading:
  checking, by the agent, for one or more iframes; and
  attaching, by the agent and when the one or more iframes are found, load listeners to the one or more iframes.

14. The method of claim 9, wherein the agent determines that the web page is idle by determining whether a Java script engine of the web browser is idle.

15. The method of claim 14, wherein the agent determines whether the Java script engine is idle by determining whether at least one network request has ended in a most recent pre-determined time period.

16. The method of claim 9, further comprising:
  receiving, by the device, data associated with one or more monitored applications on the plurality of interconnected nodes at the device;
  identifying, by the device, performance issues with the one or more the monitored applications from the received data; and
  determining, by the device, a relationship between the identified performance issues and the generated report of the web page.

17. A non-transitory computer readable medium embodying instructions when executed by a processor to cause operations to be performed, the operations including:
  receiving, by a device in a distributed business transaction monitoring system, a report generated by an agent in the distributed business transaction monitoring system, wherein the report is generated by the agent when the agent determines that a web page loading on a web browser of a client device the device is monitoring has completed loading and is idle;
  identifying, by the device, nodes of interest and one or more chains of nodes connected to the nodes of interest as a plurality of interconnected nodes based on the received report;
  generating, by the device, an interactive flow map of the plurality of interconnected nodes in the distributed business transaction monitoring system;
  providing, by the device, the interactive flow map to a user interface for displaying the interactive flow map; and
  causing, by the device, the user interface to automatically display the interactive flow map and the report through the user interface.

18. The non-transitory computer readable medium of claim 17, wherein the agent determines that the web page has completed loading by:
  setting, by the agent, a dynamic watchdog repeating timer at a value;
  starting, by the agent, the timer; and
  recursively checking, by the agent, for whether the web page has completed loading.

19. The non-transitory computer readable medium of claim 17, wherein the agent determines that the web page is idle by determining whether a Java script engine of the web browser is idle.

20. The non-transitory computer readable medium of claim 17, the operations further comprising:
  receiving, by the device, data associated with one or more monitored applications on the plurality of interconnected nodes at the device;
  identifying, by the device, performance issues with the one or more the monitored applications from the received data; and
  determining, by the device, a relationship between the identified performance issues and the generated report of the web page.

\* \* \* \* \*

UNITED STATES PATENT AND TRADEMARK OFFICE
CERTIFICATE OF CORRECTION

PATENT NO. : 10,862,780 B2
APPLICATION NO. : 16/445455
DATED : December 8, 2020
INVENTOR(S) : Ryan O'Connell Page 1 of 1

It is certified that error appears in the above-identified patent and that said Letters Patent is hereby corrected as shown below:

In the Specification

Column 7, Line 21, please amend as shown:
istration server for the application intelligence platform. The Column 10, Line 17, please amend as shown:
application agent node cannot belong to more than one tier.

Column 11, Line 65, please amend as shown:
Snapshots provide a detailed picture of a given application at a Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*